Figure 1:
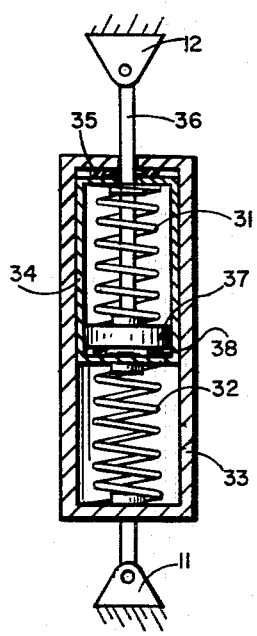

Jan. 18, 1966  W. H. QUICK  3,229,951
RESILIENT MOUNTING SYSTEM
Original Filed Dec. 7, 1960

INVENTOR.
WILLIAM H. QUICK
BY
ATTORNEY

United States Patent Office 3,229,951
Patented Jan. 18, 1966

3,229,951
RESILIENT MOUNTING SYSTEM
William H. Quick, La Mirada, Calif., assignor to
North American Aviation, Inc.
Original application Dec. 7, 1960, Ser. No. 74,323, now
Patent No. 3,131,903, dated May 5, 1964. Divided
and this application Sept. 10, 1963, Ser. No. 313,716
3 Claims. (Cl. 248—358)

This application is a division of application Serial No. 74,323, filed December 7, 1960, entitled Frangible and Resilient Mouting System, now Patent No. 3,131,903, issued May 5, 1964.

This invention relates to mounting systems, and more particularly to a shock mounting system for maintaining mounting rigidity below a predetermined force and mounting resiliency above a predetermined force.

Precision instruments used in moving vehicles such as airplanes and submarines, often incorporate design features which require rigid mounting of the instrument to the vehicle frame. For example, an autonavigator in a submarine may be rigidly secured to the submarine hull in accordance with design criteria to provide a common reference alignment with other systems. Unfortunately, the packaging design features of the precision and often fragile components of the autonavigator are incompatible with the severe stresses encountered. Thus, in a submarine having an autonavigator rigidly attached to its hull, shock forces transmitted through the hull such as those resulting from nearby depth charges or sudden changes in course are transmitted directly through the rigid mounting to the autonavigator components. These precision components are unable to withstand the severe shock and often suffer extreme damage.

Typical mounting systems have utilized resilient shock absorbing devices such as rubber mounts and pressurized fluid mounts to absorb the shock received by a supporting frame. However, in some systems such as a precision autonavigator instrument in a submarine, the reliability of operation depends upon a rigid mounting and therefore, resilient shock absorbers are unsatisfactory. As a result, the choice in the prior art has been to either provide resilient shock mounts and protect the precision instrument at the expense of accuracy and reliability, or to provide rigid mounts leaving the instrument helpless in the face of severe shocks. Accordingly, it is an object of this invention to provide an improved shock mount system.

The system of applicant's invention provides a mounting system which combines the features of rigidity and resiliency to maintain accuracy and operability during the transmission of severe shocks from the mounting frame. Simple, reliable, and highly effective structure allows a mass to be mounted to be rigidly supported by a support frame during minor shock forces and to be resiliently supported by the frame during major shock forces. In this manner, the mass is protected from severe shock and rigidly supported during normal operation.

It is therefore another object of this invention to provide a mounting system for rigidly supporting a mass for minor shocks and resiliently supporting the mass for major shocks.

It is still another object of this invention to provide a mounting system which combines the advantages of rigid and resilient mounting.

It is still a further object of this invention to provide a mounting system which is rigid up to a predetermined force, resilient above the predetermined force, and rigid again when the force falls below the predetermined force.

Figure 2:
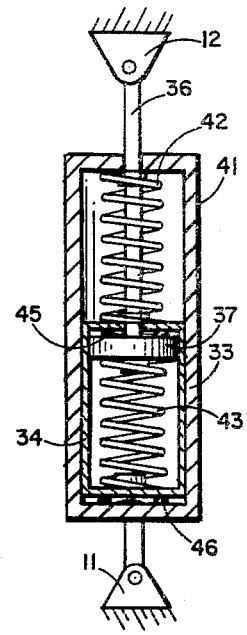
Figure 3:
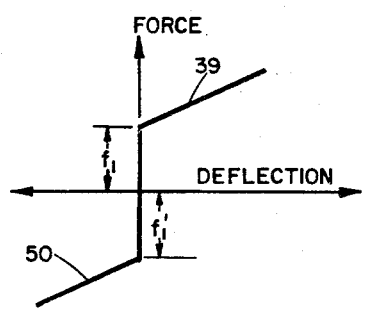

Other objects of the invention will become apparent from the following description taken in connection with the accompanying drawings in which FIG. 1 illustrates a shock mount according to the invention;

FIG. 2 illustrates a shock mount according to another embodiment of the invention; and FIG. 3 is a force versus piston deflection diagram pertaining to the shock mounts of FIGS. 1 and 2.

Referring now to FIGS. 1 and 2, there is illustrated a pair of shock mounts according to an aspect of this invention which combine the features of resiliency and rigidity. In the shock mount of FIG. 1, a pair of precompressed springs 31 and 32 are adapted to provide a combined rigid and resilient shock mount for mounting the mass 11 to the supporting frame 12. The mass 11 is rigidly attached to an outer cylinder 33. An inner cylinder 34 is adapted to move between the lower end and the upper end of the outer cylinder 33. The upper end of the outer cylinder 33 has a seat 35 for terminating the upper movement of the inner cylinder 34. The upper ends of the outer cylinder 33 and the inner cylinder 34 have openings adapted to receive a plunger 36 which has one end attached to the support frame 12 and a piston end 37 adapted to fit against a seat 38 attached to the lower end of the cylinder 34. The precompressed spring 32 has its ends adapted to push against the lower end of the outer cylinder 33 and the outside lower end of the inner cylinder 34. In compression the spring 32 tends to force the inner cylinder 34 against the seat 35. The precompressed spring 31 is placed between the piston 37 and the upper end of the lower cylinder 34. The spring 31 is precompressed to force the piston end 37 of the plunger 36 against the seat 38.

In operation, the shock mount shown in FIG. 1 operates for tension and compression shock forces. As shown in the upper half of the force deflection diagram of FIG. 3, no deflection occurs until the force reaches the precompression spring constant of the upper spring 31 which as shown in FIG. 3, is equal to $f_1$, for example. A shock force exceeding $f_1$, acting on the frame 12, causes the piston 37 to move away from the lower seat and move upward as shown in the line 39. Therefore, it may be realized that for forces lower than $f_1$, the shock mount in FIG. 1 is rigidly mounting the mass 11 to the frame 12 and for forces exceeding $f_1$ the mount is resiliently supporting the mass 11 to the frame 12.

From the force deflection diagram of FIG. 3, it may be seen that the shock mount of FIG. 1 provides a zero deflection between the mass 11 and the frame 12 for forces below $f_1$ and a deflection as indicated on the line 39 for forces above $f_1$. Again, when the force exerted drops below $f_1$ after having exceeded that force, the device automatically returns to its rigid mounting feature without any reset necessary.

The shock mount 41 shown in FIG. 2 is constructed similarly to the mount in FIG. 1 and is adapted to provide support for tension and compression forces. In the mount 41, an upper spring 42 is attached between the upper end of the outer cylinder 33 and the upper end of the inner cylinder 34. The plunger 36 has its end protruding through the upper ends of cylinders 33 and 34. A seat 45 at the upper end of inner cylinder 34 receives the piston end 37 of plunger 36. The piston 37 is forced against the seat 45 by lower spring 43 which is attached between the lower end of the cylinder 34 and the piston end 37. A seat 46 at the lower end of the outer cylinder 33 supports the cylinder 34 when forced by the spring 42.

In operation of the mount of FIG. 2, illustrated by the diagram in FIG. 3, for forces below $f_1'$, for example, the spring constant of springs 42 and 43 force the piston 37 against the seat 45 and the inner cylinder 34 against the seat 46 thereby maintaining mounting rigidity. For forces exceeding $f_1'$ the deflection of the mount is shown as line 50 in FIG. 3.

Thus it may be seen, that the mounts in FIGS. 1 and 2 operate as a shock mount allowing essentially no motion until a pre-established force is reached. Opon reaching of a predetermined force, the mounts act as a resilient shock mount with freedom under a controlled spring rate being permitted. Upon removal of the force, the units shown in FIG. 1 and FIG. 2 will return to their original position thereby providing an advantage in that no reset is necessary since they automatically reset.

Another advantage of the shock mounts of FIGS. 1 and 2 is that when the two seats 38 and 35 in FIG. 1, for example, are in abutment with piston 37 and the top end of cylinder 34 respectively, the length of the unit is precisely determined. The preloading provided by the springs assures that there is no backlash when the unit returns to rigid operation following resilient operation.

Although the invention has been described and illustrated in detail, it is to be clearly understood that the same is by way of illustration and example only and is not to be taken by way of limitation, the spirit and scope of this invention being limited only by the terms of the appended claims.

I claim:

1. In a mounting system, a support frame, a mass, shock absorbing means for mounting said mass to said support frame comprising an outer cylinder having one end rigidly secured to said mass, an inner cylinder adapted to move within said outer cylinder, a first spring mounted in said outer cylinder for pressing said inner cylinder against the other end of said outer cylinder, a plunger having one end secured to said frame and the other end passing through the other end of said outer cylinder and said inner cylinder and having fixedly mounted on said other end a piston, said piston adapted to move substantially the full length of said outer cylinder, a second spring mounted in said inner cylinder for pressing said piston against the one end of said inner cylinder.

2. A shock absorbing system for use in mounting a mass to a frame comprising a first outer cylinder having a closed lower end rigidly attached to said mass, a second inner cylinder mounted in said outer cylinder and adapted to move within said outer cylinder, a first spring mounted for compression having one end contacting the lower end of said first cylinder and having the other end contacting the lower end of said second cylinder, said first cylinder having a seat at its upper end for holding the upper end of said inner cylinder by a force determined by the spring constant of said first spring, a plunger having a piston fixedly attached to one end, the other end of said plunger attached to said frame, the upper ends of said first and second cylinders having an opening receiving said plunger, a second spring mounted for compression having one end contacting the upper end of said second cylinder and having the other end contacting the piston end of said plunger, the lower end of said second cylinder having a seat for holding the piston of said plunger by a force determined by the spring constant of said second spring, said piston adapted to move substantially the full length of said outer cylinder.

3. A shock absorbing system for use in mounting a mass to a supporting frame comprising an outer cylinder having a lower end attached to said mass, an inner cylinder mounted in said outer cylinder and adapted to move a substantial distance within said outer cylinder, a first spring mounted for compression to force the lower end of said inner cylinder against the lower end of said outer cylinder, a plunger having an upper end attached to said supporting frame and having a lower piston end passing through the upper ends of said inner and outer cylinders, said piston adapted to move substantially the full length of said outer cylinder, a second spring mounted for compression to force said piston against the upper end of said inner cylinder whereby said first and second springs exert a predetermined force towards said device and said support.

References Cited by the Examiner

UNITED STATES PATENTS

| 1,350,056 | 8/1920 | Barry | 248—358.1 |
| 2,678,796 | 5/1954 | Ray | 248—21 X |
| 2,688,884 | 9/1954 | Marmoes | 267—1 |
| 2,694,156 | 11/1954 | Cerminara | 267—1 X |

FOREIGN PATENTS 1,017,777   10/1952   France.

CLAUDE A. LE ROY, *Primary Examiner.*

FRANK L. ABBOTT, *Examiner.*